(12) United States Patent
Thistle et al.

(10) Patent No.: US 10,731,479 B2
(45) Date of Patent: Aug. 4, 2020

(54) BLADE PLATFORM WITH DAMPER RESTRAINT

(71) Applicant: United Technologies Corporation, Farmington, CT (US)

(72) Inventors: Charles Thistle, Middletown, CT (US); Mohamed Hassan, Palm City, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 310 days.

(21) Appl. No.: 15/397,557

(22) Filed: Jan. 3, 2017

(65) Prior Publication Data

US 2018/0187562 A1    Jul. 5, 2018

(51) Int. Cl.
*F01D 5/22* (2006.01)
*F01D 11/00* (2006.01)
*F01D 5/26* (2006.01)

(52) U.S. Cl.
CPC .......... *F01D 5/22* (2013.01); *F01D 5/26* (2013.01); *F01D 11/006* (2013.01); *F05D 2220/32* (2013.01); *F05D 2240/80* (2013.01); *F05D 2260/36* (2013.01); *F05D 2260/96* (2013.01); *Y02T 50/671* (2013.01); *Y02T 50/673* (2013.01); *Y10S 416/50* (2013.01)

(58) Field of Classification Search
CPC ...... F01D 11/005; F01D 11/006; F01D 25/04; F01D 25/06; F04D 29/668
USPC .............................................. 416/193 A, 500
See application file for complete search history.

(56) References Cited

U.S. PATENT DOCUMENTS

| 3,709,631 A | 1/1973 | Karstensen et al. |
| 3,752,598 A * | 8/1973 | Bowers ................. F01D 5/3007 415/115 |
| 4,029,436 A | 6/1977 | Shoup et al. |
| 4,183,720 A | 1/1980 | Brantley |
| 4,580,946 A | 4/1986 | Bobo |
| 5,143,517 A | 9/1992 | Vermont |
| 5,156,528 A * | 10/1992 | Bobo ........................ F01D 5/22 416/190 |

(Continued)

FOREIGN PATENT DOCUMENTS

| EP | 0851097 A2 | 7/1998 |
| EP | 1221539 A2 | 7/2002 |

(Continued)

OTHER PUBLICATIONS

English Machine Translation of EP2098687.

(Continued)

*Primary Examiner* — Michael Lebentritt
*Assistant Examiner* — Topaz L. Elliott
(74) *Attorney, Agent, or Firm* — Cantor Colburn LLP

(57) ABSTRACT

A blade having: a root; a platform located between the root and the blade, wherein the platform defines a cavity; a damper restraint retaining a lateral edge of a damper seal received in the cavity, wherein the lateral edge of the damper seal extends between a first end portion and an opposing second end portion of the damper seal, the first end portion and the second end portion extend towards the root when the damper seal is located in the cavity and wherein the damper restraint extends along and adjacent to a portion of the lateral edge of the damper seal.

14 Claims, 8 Drawing Sheets

(56) References Cited

U.S. PATENT DOCUMENTS

| | | | | |
|---|---|---|---|---|
| 5,161,949 A | * | 11/1992 | Brioude | F01D 5/22 416/193 A |
| 5,226,784 A | * | 7/1993 | Mueller | F01D 5/22 416/248 |
| 5,313,786 A | | 5/1994 | Chlus et al. | |
| 5,415,526 A | | 5/1995 | Mercadante et al. | |
| 5,478,207 A | | 12/1995 | Stec | |
| 5,785,499 A | * | 7/1998 | Houston | F01D 11/008 416/248 |
| 5,820,346 A | * | 10/1998 | Young | F01D 5/22 416/193 A |
| 5,827,047 A | * | 10/1998 | Gonsor | F01D 5/22 416/193 A |
| 6,171,058 B1 | * | 1/2001 | Stec | F01D 5/22 416/193 A |
| 6,450,769 B2 | * | 9/2002 | Szwedowicz | F01D 5/22 416/190 |
| 6,478,544 B2 | | 11/2002 | Brandel et al. | |
| 6,851,932 B2 | | 2/2005 | Lagrange et al. | |
| 7,021,898 B2 | | 4/2006 | Elliott et al. | |
| 7,121,802 B2 | * | 10/2006 | Athans | F01D 5/22 416/193 A |
| 7,762,773 B2 | | 7/2010 | Liang | |
| 8,167,563 B2 | | 5/2012 | Kayser | |
| 8,240,987 B2 | * | 8/2012 | Spangler | F01D 11/006 415/115 |
| 8,322,990 B2 | * | 12/2012 | Hunt | F01D 5/10 415/119 |
| 8,353,672 B2 | * | 1/2013 | Townes | F01D 5/10 416/190 |
| 8,820,754 B2 | | 9/2014 | Stewart | |
| 8,888,456 B2 | | 11/2014 | Borufka et al. | |
| 8,961,137 B2 | | 2/2015 | Berche | |
| 2010/0054917 A1 | | 3/2010 | Razzell | |
| 2010/0061854 A1 | | 3/2010 | Townes et al. | |
| 2013/0195665 A1 | * | 8/2013 | Snyder | F01D 5/22 416/174 |
| 2013/0276456 A1 | * | 10/2013 | Propheter-Hinckley | F01D 5/22 60/805 |
| 2016/0061048 A1 | * | 3/2016 | Corcoran | F01D 11/006 416/171 |
| 2016/0251963 A1 | | 9/2016 | Tardif et al. | |
| 2016/0273367 A1 | * | 9/2016 | Lana | F01D 5/26 |
| 2018/0149025 A1 | | 5/2018 | Thistle et al. | |
| 2018/0187558 A1 | | 7/2018 | Thistle et al. | |
| 2018/0187559 A1 | | 7/2018 | Thistle et al. | |

FOREIGN PATENT DOCUMENTS

| | | | | |
|---|---|---|---|---|
| EP | 1600606 A1 | * | 11/2005 | F01D 5/22 |
| EP | 1867836 A2 | | 12/2007 | |
| EP | 2098687 A1 | | 9/2009 | |
| FR | 2927357 A1 | | 8/2009 | |
| JP | H09303107 A | | 11/1997 | |
| JP | 2003020995 A | | 1/2003 | |
| JP | 2003056490 A | * | 2/2003 | F01D 11/006 |
| JP | 2006125372 A | * | 5/2006 | F01D 5/22 |
| JP | 2014185646 A | * | 10/2014 | F01D 5/22 |
| WO | WO-03014529 A1 | * | 2/2003 | F01D 5/22 |
| WO | 2007063128 A1 | | 6/2007 | |
| WO | WO-2007063128 A1 | * | 6/2007 | F01D 5/082 |
| WO | 2013154657 A2 | | 10/2013 | |
| WO | 2014004001 A1 | | 1/2014 | |
| WO | WO-2014160641 A1 | * | 10/2014 | F01D 11/006 |

OTHER PUBLICATIONS

English Machine Translation of FR2927357.
European Search Report for Application No. EP 18 15 0229.
English Machine Translation for JPH09303107.
European Search Report for Application No. EP 17 20 4019.
European Search Report for Application No. EP 18 15 0231.
European Search Report for Application No. EP 18 15 0242.
JP2003020995 English Machine Translation of Abstract.

* cited by examiner

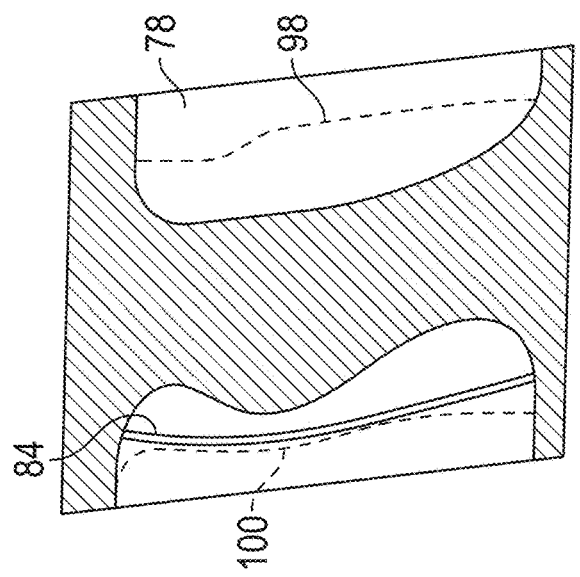
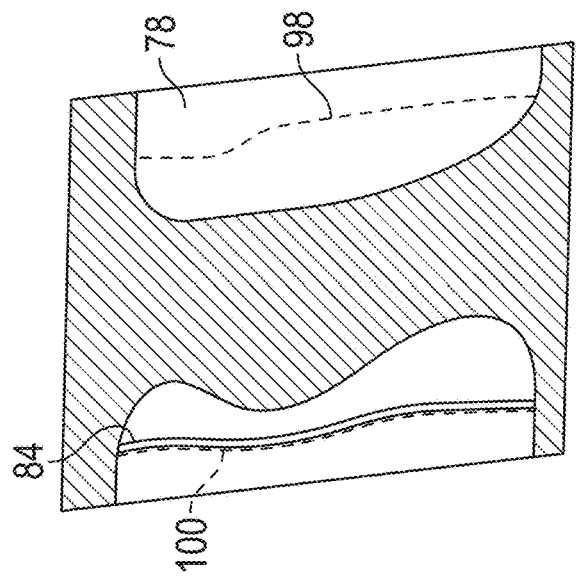
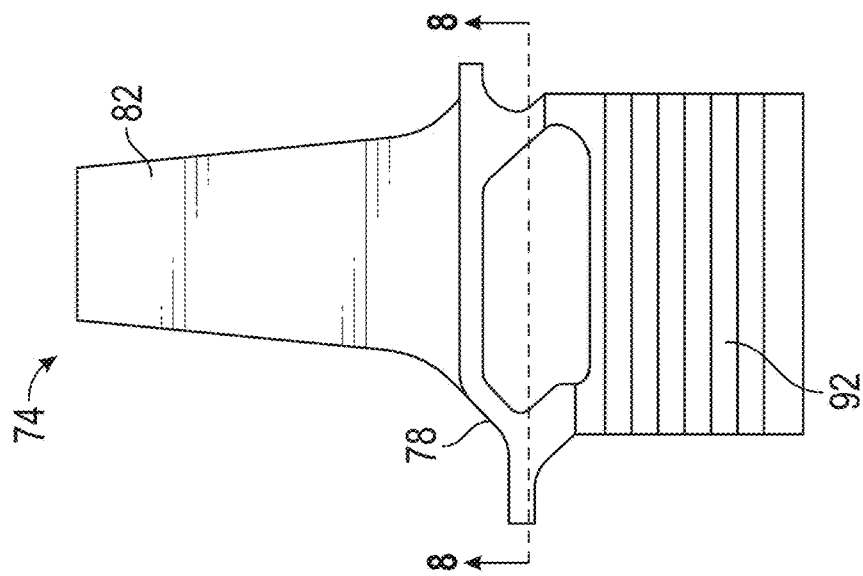

BLADE PLATFORM WITH DAMPER RESTRAINT

BACKGROUND

Exemplary embodiments of the present disclosure are directed to turbine blades and/or compressor blades for a gas turbine engine and methods for restraining a damper of a turbine blade and/or compressor blade.

A gas turbine engine includes a plurality of turbine blades and compressor blades each received in a slot of a disk. The blades are exposed to aerodynamic forces that can result in vibratory stresses. A seal damper or damper can be located under platforms of adjacent blades to reduce the vibratory response and provide frictional damping between the blades. The seal damper slides on an underside of the platforms. The seal damper is made of a material that is dissimilar from the material of the blades. When the vibratory motions of adjacent blades oppose each other (that is, occur out of phase), the seal damper slides to absorb the energy of vibration.

Seal dampers work by conforming to the underside of blade platforms to seal the mate-face gap between blades and provide frictional damping to suppress the vibratory response of the blades to excitations in the engine. These dampers are typically made of sheet metal and have been shown to readily conform to the underside of the platform when subjected to centrifugal loads in a high temperature environment due to their lack of stiffness out-of-plane.

Sometimes seal dampers will experience unintentional bulk tangential movement relative to the damper pocket due to the dynamic forces imposed on it by the rotation of the blades and the lack of sufficient restraint devices. To maximize damper efficiency, damper configurations are sought which minimize weight and maximize damper stiffness. Thus it is desirable to limit the number of weight increasing restraint devices on the damper (i.e. features which interlock with "damper tabs", "damper nubs", or some other feature of the under-platform geometry, or "bathtub" type designs that pre-conform to under-platform filleting).

Accordingly, it is desirable to a method and apparatus for restraining movement of a damper with respect to a blade platform.

BRIEF DESCRIPTION

In one embodiment, a blade is provided. The blade having: a root; a platform located between the root and the blade, wherein the platform defines a cavity; a damper restraint retaining a lateral edge of a damper seal received in the cavity, wherein the lateral edge of the damper seal extends between a first end portion and an opposing second end portion of the damper seal, the first end portion and the second end portion extend towards the root when the damper seal is located in the cavity and wherein the damper restraint extends along and adjacent to a portion of the lateral edge of the damper seal.

In addition to one or more of the features described above, or as an alternative to any of the foregoing embodiments, the damper restraint may extend along an entire length of the lateral edge of the damper seal.

In addition to one or more of the features described above, or as an alternative to any of the foregoing embodiments, the damper restraint may be a protrusion that extends away from an interior surface of the platform.

In addition to one or more of the features described above, or as an alternative to any of the foregoing embodiments, the damper restraint may be a plurality of protrusions that extend away from an interior surface of the platform.

In addition to one or more of the features described above, or as an alternative to any of the foregoing embodiments, the damper restraint may be a rail extending away from an interior surface of the platform that is configured to mirror a contour of the lateral edge of the damper seal.

In addition to one or more of the features described above, or as an alternative to any of the foregoing embodiments, the damper restraint may be a groove formed in an interior surface of the platform.

In addition to one or more of the features described above, or as an alternative to any of the foregoing embodiments, the damper restraint may be located on a suction side of the blade.

In addition to one or more of the features described above, or as an alternative to any of the foregoing embodiments, the damper restraint may be located on a pressure side of the blade.

In addition to one or more of the features described above, or as an alternative to any of the foregoing embodiments, the damper seal may be formed from stamped sheet metal.

In addition to one or more of the features described above, or as an alternative to any of the foregoing embodiments, the blade may be a turbine blade or a compressor blade.

In another embodiment, a gas turbine engine is provided. The gas turbine engine having: a disk; a plurality of blades secured to the disk, each of the blades having a root, and a platform located between the root and the blade, wherein a seam is defined by adjoining platforms of each of the blades when they are secured to the disk, wherein the platform of each of the plurality of blades defines a cavity and has a damper restraint retaining a lateral edge of a damper seal received in the cavity, wherein the damper seal covers the seam and the lateral edge of the damper seal extends between a first end portion and an opposing second end portion of the damper seal, the first end portion and the second end portion extend towards the root when the damper seal is located in the cavity and wherein the damper restraint extends along and contacts a portion of the lateral edge of the damper seal.

In addition to one or more of the features described above, or as an alternative to any of the foregoing embodiments, the damper restraint may extend along an entire length of the lateral edge of the damper seal.

In addition to one or more of the features described above, or as an alternative to any of the foregoing embodiments, the damper restraint may be a protrusion that extends away from an interior surface of the platform.

In addition to one or more of the features described above, or as an alternative to any of the foregoing embodiments, the damper restraint may be a plurality of protrusions that extend away from an interior surface of the platform.

In addition to one or more of the features described above, or as an alternative to any of the foregoing embodiments, the damper restraint may be a rail extending away from an interior surface of the platform that is configured to mirror a contour of the lateral edge of the damper seal.

In addition to one or more of the features described above, or as an alternative to any of the foregoing embodiments, the damper restraint may be a groove formed in an interior surface of the platform.

In addition to one or more of the features described above, or as an alternative to any of the foregoing embodiments, the damper restraint may be located on a suction side of the blade.

In addition to one or more of the features described above, or as an alternative to any of the foregoing embodiments, the damper restraint may be located on a pressure side of the blade.

In addition to one or more of the features described above, or as an alternative to any of the foregoing embodiments, the damper seal may be formed from stamped sheet metal.

In addition to one or more of the features described above, or as an alternative to any of the foregoing embodiments, the blade may be a turbine blade or a compressor blade.

In another embodiment, a method of damping vibrations between adjoining blades of a gas turbine engine is provided. The method including the steps of: locating a damper seal adjacent to a seam defined by adjoining platforms of blades of the gas turbine engine; and restraining the movement of the damper seal in a direction away from the seam by retaining a lateral edge of the damper seal with a damper restraint formed in an underside surface of one of the adjoining platforms.

In addition to one or more of the features described above, or as an alternative to any of the foregoing embodiments, the damper restraint may be located on a suction side of the blade.

In addition to one or more of the features described above, or as an alternative to any of the foregoing embodiments, the blade may be a turbine blade or a compressor blade.

BRIEF DESCRIPTION OF THE DRAWINGS

The following descriptions should not be considered limiting in any way. With reference to the accompanying drawings, like elements are numbered alike:

FIG. 7 is a side view of a turbine blade with an under platform damper restraint;

FIG. 8A is a view along lines 8-8 of FIG. 7 according to one embodiment;

FIG. 8B is a view along lines 8-8 of FIG. 7 according to another embodiment;

DETAILED DESCRIPTION

A detailed description of one or more embodiments of the disclosed apparatus and method are presented herein by way of exemplification and not limitation with reference to the Figures.

Figure 1:
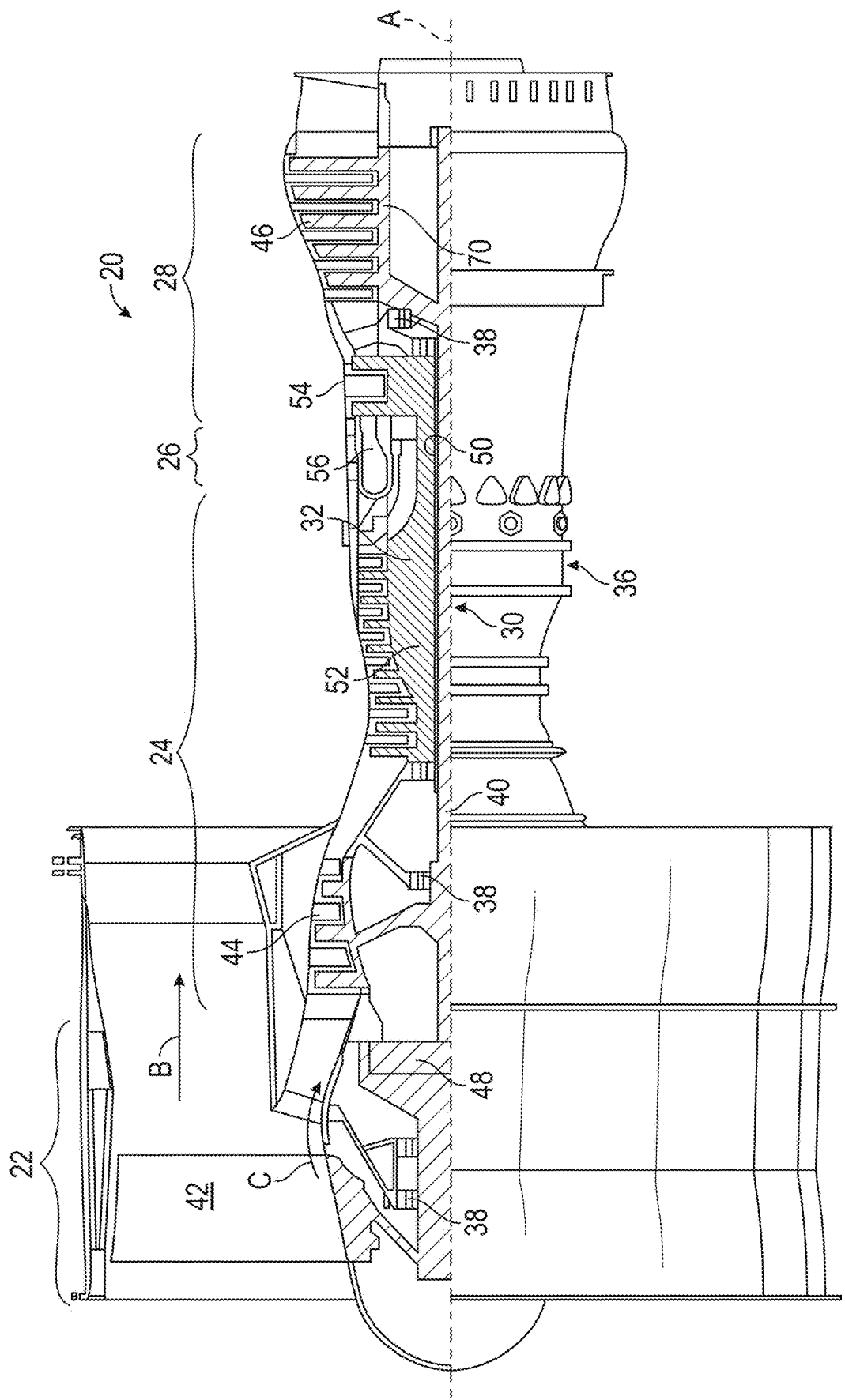
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 m/sec).

The turbine section 28 includes turbine discs 70 that each rotate about the axis A. As is known in the related arts, the turbine section may include a plurality of stages each having a plurality of turbine blades mounted to respective turbine disk of each stage.

Figure 2:
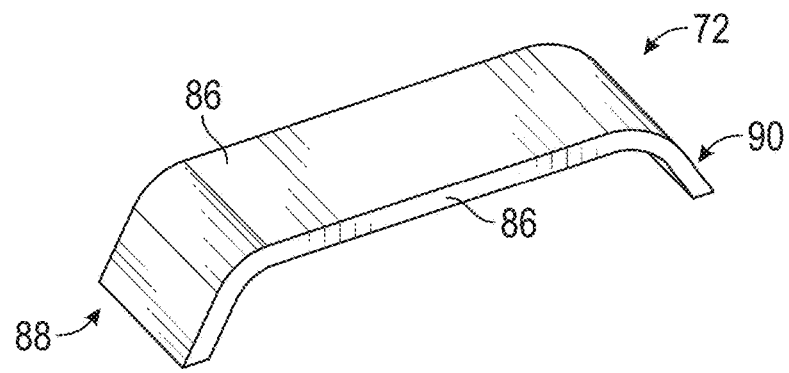
FIG. 2 is a non-limiting perspective view of a damper or damper seal.
Figure 3:
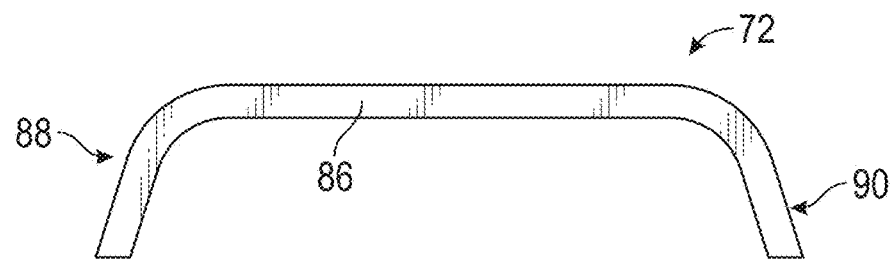
FIG. 3 is a side view of the damper seal illustrated in FIG. 2.

FIG. 2 illustrates a non-limiting perspective view of a damper seal or damper 72 for installation under platforms of adjacent turbine blades to reduce the vibratory response and provide frictional damping between the turbine blades as well as sealing the mate-face gap between blades. These dampers may be made of sheet metal and conform to the underside of the platform when subjected to centrifugal loads in a high temperature environment due to their lack of stiffness out-of-plane. Although the present disclosure is described with reference to turbine blades it is understood that anyone of the various embodiments disclosed herein may be applied to platforms of adjacent compressor blades of a compressor disc or rotor to reduce the vibratory response and provide frictional damping between the compressor blades as well as sealing the mate-face gap between blades. Therefore and when referring to FIGS. 4-15 these may alternatively be referred to as compressor blades. Moreover, various embodiments of the present disclosure may be applied in any other application where there is a desire to reduce the vibratory response and provide frictional damping between two adjoining items that are rotated about an axis as sealing the mate-face gap between the two adjoining items. FIG. 3 is a side view of the damper seal or damper 72 illustrated in FIG. 2.

The damper seal or damper 72 may also be formed by direct metal laser sintering. Other manufacturing methods are possible. The damper seal 72 may be ductile enough to conform to a lower surface of the platform of the turbine blade. In one example, the damper seal 72 is substantially c-shaped.

Figure 4:
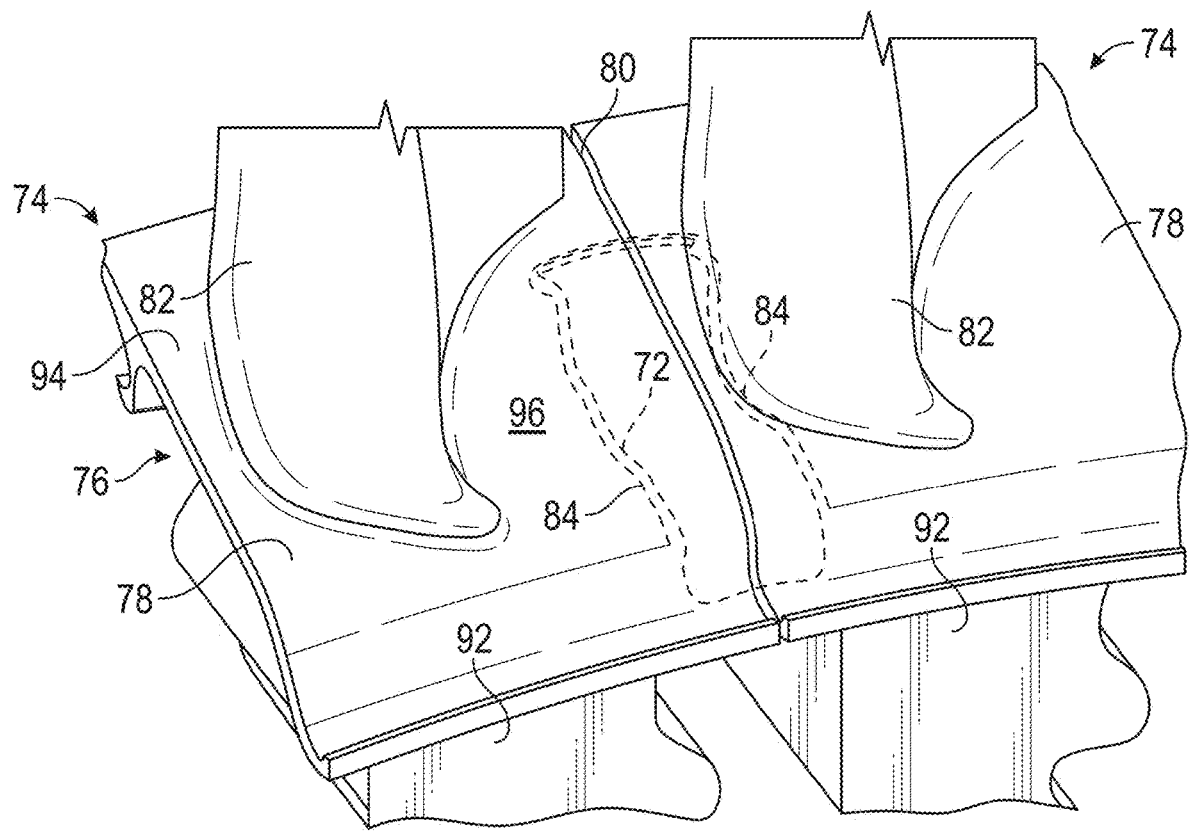
FIG. 4 is a perspective view of a damper seal installed between two adjacent turbine blades.
Figure 6:
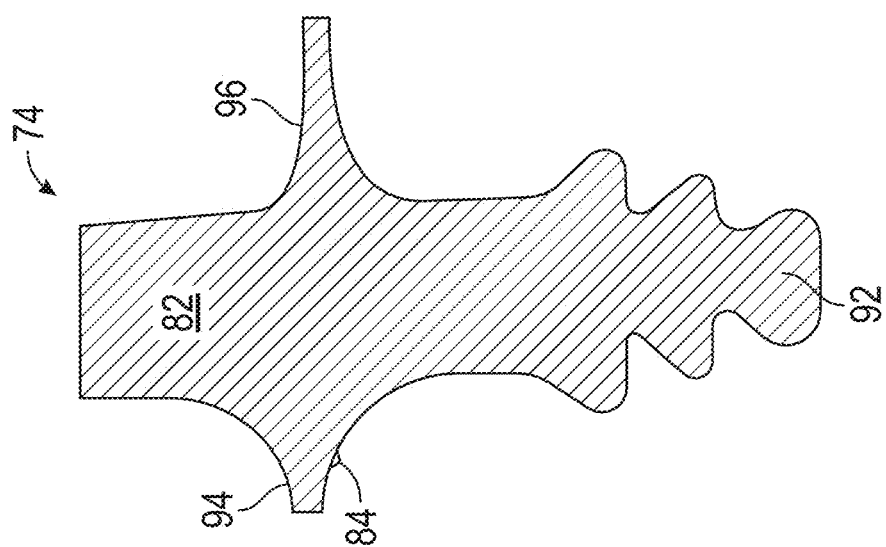
FIG. 6 is a view along lines 6-6 of FIG. 5.
Figure 5:
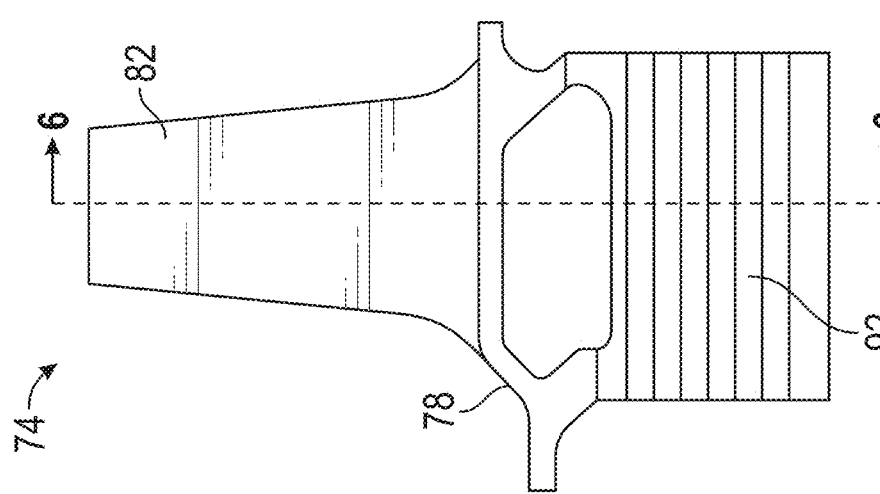
FIG. 5 is a side view of a turbine blade with an under platform damper restraint.
Figure 9:
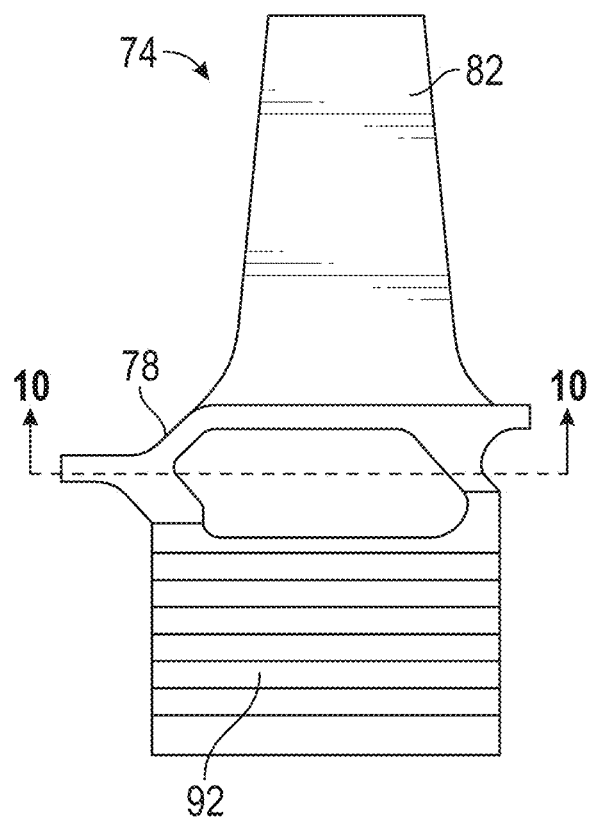
FIG. 9 is a side view of a turbine blade with an under platform damper restraint according to yet another embodiment.

Referring now to FIG. 4, a top perspective view of the damper seal 72 installed in adjacent turbine blades 74 is provided. The damper seal 72 is located in a neck cavity 76 of the turbine blades 74. As illustrated in at least FIGS. 5-14, the neck cavity 76 is defined as being located below the platform 78 of the turbine blade 74 and above the turbine disk the blades 74 are secured to.

As illustrated, the damper seal 72 spans a space 80 between adjacent platforms 78 of adjacent turbine blades 74 to provide both damping and sealing and prevent the leakage of the cooling air from the cavity 76. The damper seal 72 imposes a normal load on the adjacent turbine blades 74 due to centrifugal force. The resulting frictional force created by the normal load produces damping to reduce a vibratory response. The damper seal 72 prevents the cooling air in the neck cavity 76 from leaking into the hot flow gas path between airfoils 82 of the turbine blades 74.

The damper seal 72 is located under the platforms 78 of adjacent turbine blades 74 and spans the space 80 between the platforms 78. In accordance with an embodiment of the present disclosure, a damper restraint 84 for retaining a lateral edge 86 of a damper seal 72 received in the cavity 76 is provided. In one embodiment, the lateral edge 86 of the damper seal 72 may refer to the edge that extends between a first end portion 88 and an opposing second end portion 90 of the damper seal 72. As illustrated, the first end portion 88 and the second end portion 90 extend towards a root 92 of the turbine blade 74 when the damper seal 72 is located in the cavity 76.

In one embodiment and as illustrated in the attached FIGS., the damper restraint 84 may be a raised feature, or rail or "bump", under the suction side 94 of the platform 78 that runs along the edge 86 of the damper 72. Alternatively, the damper restraint 84 may be located on the pressure side 96. In yet another alternative embodiment, the damper restraint 84 may be located on both the pressure side 96 and the suction side 94 of adjacent platforms 78. In this embodiment, the damper restraints 84 may be positioned so that the damper 72 may move in either direction (e.g., towards the suction side 94 or the pressure side 96 of the adjacent platforms 78) until the damper contacts the damper restraint 84 and its movement is inhibited. These alternative locations are illustrated by the dashed lines in FIG. 4. In one embodiment, the damper restraint 84 runs along the entire length of edge 86. Alternatively, the damper restraint 84 may run along a majority (e.g. greater than 50%) of the entire length of edge 86. Of course, other variations less than 50% are also considered to be within the scope of various embodiments of the present disclosure.

By locating the damper restraint 84 on an interior surface 95 of the platform 78, a device is created that restrains the damper 84 from sliding toward the suction side of the pocket 76 when it is subject to tangential dynamic forces or rotational forces (e.g. induced by the orientation of the pocket (or broach angle) relative to the axis of rotation). In one embodiment and as illustrated in at least FIG. 7, the damper restraint 84 is configured to follow the contour of the edge 86 of the damper seal 72. In another embodiment, the damper restraint or rail 84 may be configured to follow a general path to allow for non-specific damper seal designs.

Figure 10:
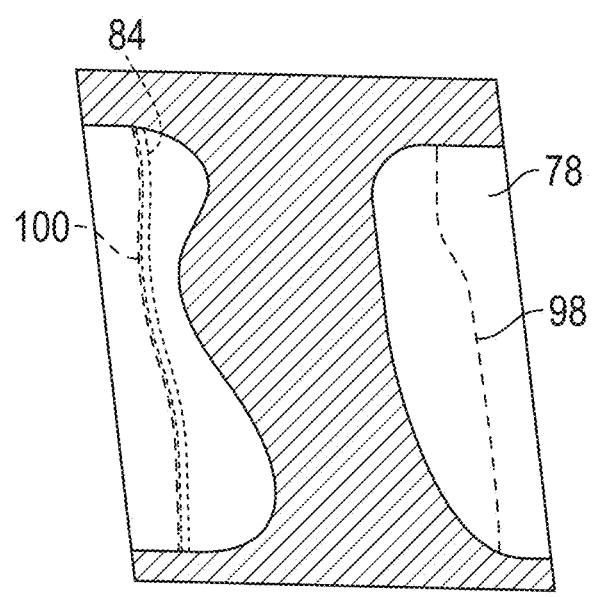
FIG. 10 is a view along lines 10-10 of FIG. 9.

In FIGS. 8A, 8B and 10 and in one embodiment, the nominal damper edge 86 position in the pressure side 96 of the turbine blade 74 is illustrated by a dashed line 98 while the position of an edge 86 of another damper 72 in the suction side 94 of the turbine blade 74 is illustrated by dashed line 100. In addition, the embodiment of FIG. 8A illustrates a damper restraint 84 or rail 84 that follows or matches the contour of the edge 86 of the damper 72 while in FIG. 8B the damper restraint 84 or rail 84 follows a general path that does not exactly follow or match the contour of the edge 86 of the damper 72 and thus allows for use with a non-specific damper design. In other words and in the FIG. 8B embodiment, the edge 86 of the damper 72 does not have to exactly match the restraint 84, which allows for variations in designs.

Figure 11A:
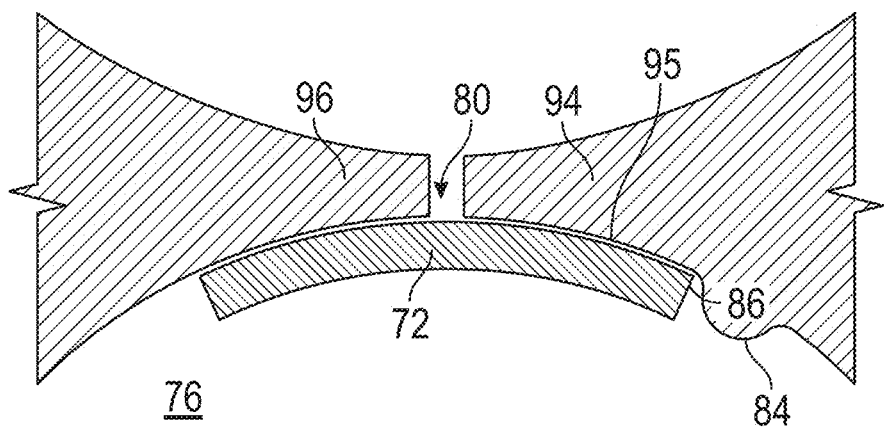
FIG. 11A is a cross sectional view illustrating an under platform damper restraint according to one embodiment.
Figure 11B:
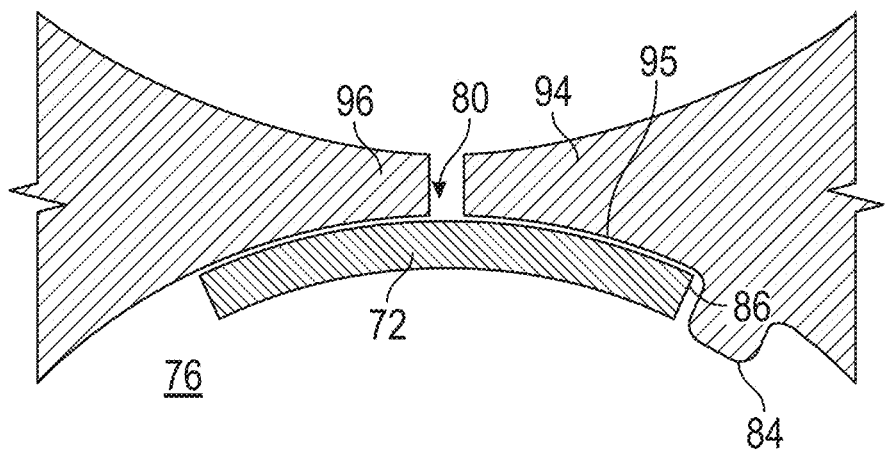
FIG. 11B is a cross sectional view illustrating an under platform damper restraint according to another embodiment.
Figure 11C:
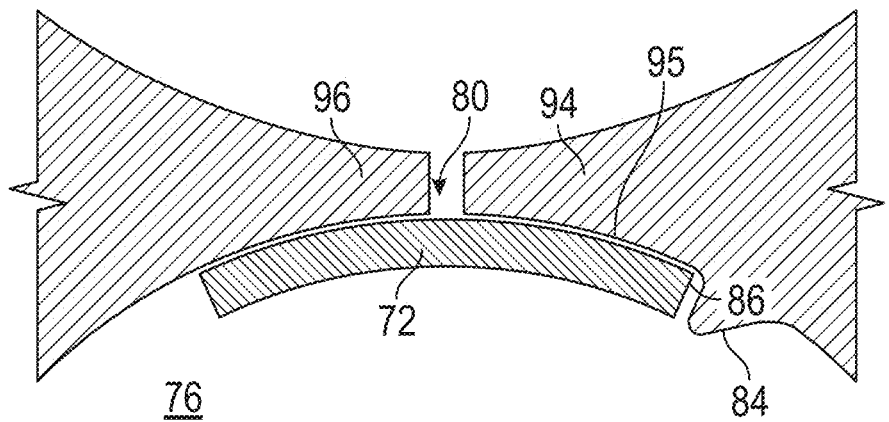
FIG. 11C is a cross sectional view illustrating an under platform damper restraint according to yet another embodiment.
Figure 12:
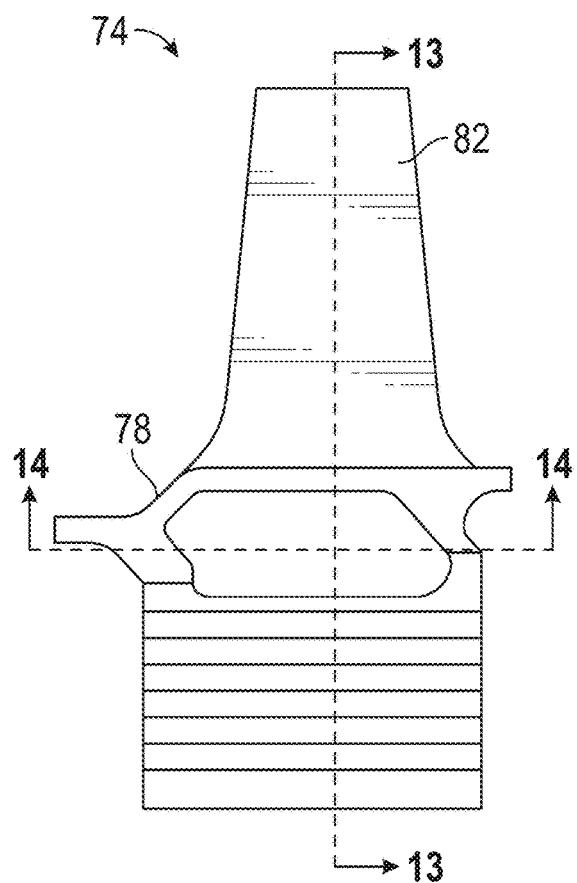
FIG. 12 is a side view of a turbine blade with an under platform damper restraint according to yet another embodiment.
Figure 13:
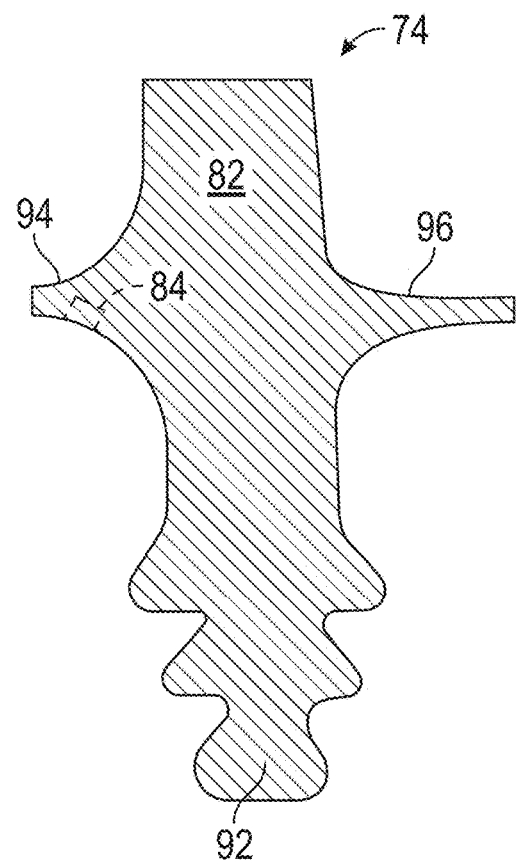
FIG. 13 is a view along lines 13-13 of FIG. 12.
Figure 14:
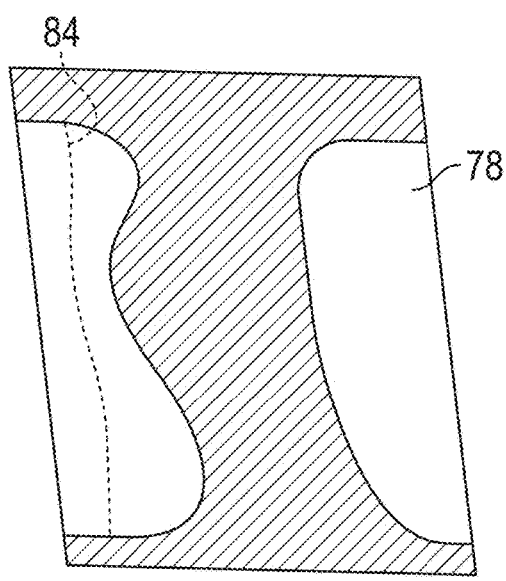
FIG. 14 is a view along lines 14-14 of FIG. 12.
Figure 15:
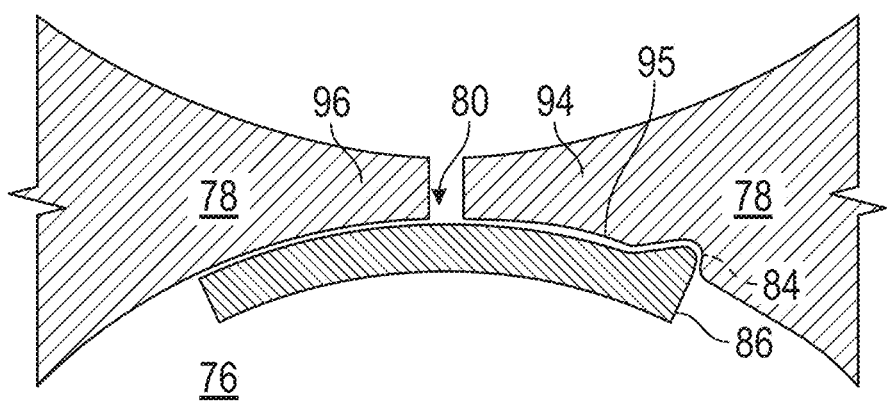
FIG. 15 is a cross sectional view illustrating an under platform damper restraint according to the embodiment of FIGS. 13 and 14.

It being understood that FIGS. 8A, 8B and 10 illustrate one non-limiting embodiment wherein a single damper restraint 84 is employed on the suction side 94 of the turbine blade 74 and two different dampers 72 are partially illustrated. Of course and as mentioned above, the damper restraint may be located on both sides of a damper 72 (e.g., the pressure side 96 of one turbine blade 74 and the suction side 94 of an adjacent turbine blade 74) or alternatively only on the pressure side 96 of adjacent turbine blades 74. In one embodiment and referring now to FIGS. 9 and 10, the rail 84 may run intermittently along the edge 86 of the damper 72. In one embodiment and referring now to the cross sectional views illustrated in at least FIGS. 11A-11C, the rail may have a smooth or rounded profile (FIG. 11A), or it may have a square (FIG. 11B), or a triangular, or other faceted profile (FIG. 11C). In one embodiment, a faceted profile on the side of the restraint 84 that abuts the damper 72, for instance, may be more effective at preventing the tangential motion of the damper 72.

This design feature (e.g., damper restraint 84) allows the potential elimination of weight increasing damper restraint devices. It can make new and current damper designs more effective without modifying the damper itself, and with only a minimal change to the blade platform that can be readily cast in. The feature can also be formed through some additive technique such as welding, and can be used as a potential aftermarket fix to reduce the amount of damper deformation seen in service.

Furthermore and in one embodiment, one or more rails, or regions of generally raised material, running along the damper edge are formed on the underside of the blade suction side or pressure side platform by casting, machining, or some additive method. The rail can follow the edge of the damper, or it can follow some general path along the suction side surface not corresponding to a specific damper design. In the former case, the rail limits bulk motion completely, while in the latter case, the rail allows some bulk movement but can accommodate multiple seal damper configurations. The rail must be raised relative to the material on the damping surface. It can run the entire length of the damper, or it can run for only a portion of it. The cross section of the rail may have a smooth or circular profile, or it can be square, triangular, or some other faceted shape.

In another embodiment and referring now to at least FIGS. 12-15, the damper restraint 84 may be a groove or trench recessed into the underside of the blade platform 78 such that the edge 86 of the damper 72 can slide into the groove or trench. This provides an alternative method to restrain the damper 72 from undergoing bulk deformation when subject to tangential dynamic forces. As the damper slides 72 or "walks" toward the suction-side (or rotates toward the pressure-side) its edge 86 will seat itself in the groove of the damper restraint 84 and further bulk motion will be prevented.

This design feature (e.g., groove illustrated in at least FIGS. 13-15) allows the potential elimination of weight increasing damper restraint devices. Seal dampers can be made much lighter and therefor much more effective. Also, it can make new and current damper designs more effective without modifying the damper itself, and with only a minimal change to the underside of the blade platform that can be readily cast or machined in. Moreover, field problems with damper deformation can be corrected relatively easily. This can be used as a potential aftermarket fix to reduce the amount of damper deformation seen in service.

In one embodiment, the groove or trench is located on the underside of the suction side 94 of the platform 78 and extends axially in the direction of the damper 72. The groove may form any path and does not have to be straight. For example and in one non-limiting embodiment, it can follow the shape of the damper edge 86. Still further, it does not have to run the entire length of the platform 78 but can be located in the areas of predicted or demonstrated bulk motion. It can be formed in the platform by casting or machining and it may have a shallow or short "entry lip" (as the damper enters the groove), it can be rounded, chamfered, etc., but it should have a reasonably sharp opposite lip to catch the damper and prevent further motion. The groove or trench may be located on suction side platform, pressure side platform, or both, depending on the predicted or observed bulk motion of the damper. In addition, the groove or trench is ideally located in low stress location of the platform 78. Structural analysis can be performed to identify acceptable locations.

In yet another embodiment, the damper restraint 84 may partially comprise a protruding portion in combination with a recessed portion (e.g., grooved or trench portion). In this embodiment, the protruding portion may be any one of the aforementioned embodiments or combinations thereof (e.g., raised feature, features, rail, rails, bump, bumps) that are continuous or extend intermittently with the recessed portion that extends continuously or intermittingly with the protruding portion.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade for a gas turbine engine, comprising:
   a root;
   a platform located between the root and an airfoil, wherein the platform defines a cavity;
   a damper seal supported by a first radially inner surface of the platform;
   a groove in the first radially inner surface, the groove having a groove bottom radially outward of the first radially inner surface, wherein the groove is positioned such that a lateral edge of the damper seal enters the groove as the damper seal moves circumferentially toward the root.

2. The blade as in claim 1, wherein the groove extends along an entire length of the lateral edge of the damper seal.

3. The blade as in claim 1, wherein the groove is located on a suction side of the blade.

4. The blade as in claim 1, wherein the groove is located on a pressure side of the blade.

5. The blade as in claim 1, wherein the damper seal is formed from stamped sheet metal and wherein the blade is either a turbine blade or a compressor blade.

6. A disc of a gas turbine engine having a plurality of blades, each of the plurality of blades comprising:
   a root;
   a platform located between the root and an airfoil, wherein the platforms of adjacent blades of the plurality of blades are located adjacent to each other in order to define a cavity; and
   a single damper restraint located on a suction side of the blade, wherein only the single damper restraint retains any lateral edge of a damper seal when the damper seal is received in the cavity and spans across a seam between adjacent platforms such that portions of the damper seal extend past the seam and along an underside of the adjacent platforms, the lateral edge of the damper seal extending between a first end portion and an opposing second end portion of the damper seal, the first end portion and the second end portion extend towards the root when the damper seal is located in the cavity and is covering the seam and wherein the damper restraint extends along and is adjacent to a portion of the lateral edge of the damper seal when the damper seal is covering the seam.

7. The blade disc as in claim 6, wherein the single damper restraint extends along an entire length of the lateral edge of the damper seal.

8. The blade disc as in claim 6, wherein the single damper restraint is a protrusion that extends away from an interior surface of the platform.

9. The disc as in claim 6, wherein the single damper restraint is a rail extending away from an interior surface of the platform that is configured to mirror a contour of the lateral edge of the damper seal.

10. The blade disc as in claim 6, wherein the single damper restraint is a groove formed in an interior surface of the platform.

11. The blade disc as in claim 6, wherein the damper seal is formed from stamped sheet metal and wherein the blade is either a turbine blade or a compressor blade.

12. A method of damping vibrations between adjacent blades of a gas turbine engine, comprising:
    sealing a seam defined by adjacent platforms of a pair of blades of a disc of the gas turbine engine by locating a damper seal over the seam wherein portions of the damper seal extend past the seam and along underside surfaces of the adjacent platforms when the damper seal is located over the seam; and
    restraining movement of the damper seal in a direction away from the seam by retaining only a single lateral edge of the damper seal with a damper restraint formed in the underside surface of one of the adjacent platforms of the pair of blades, wherein the one of the adjacent platforms of the pair of blades extends from a suction side of one of the pair of blades.

13. The method as in claim 12, wherein the pair of blades are either a pair of turbine blades or a pair of compressor blades.

14. The method as in claim 12, wherein the damper restraint is a plurality of protrusions that extend away from an interior surface of the platform.

* * * * *